United States Patent
Allouche

(10) Patent No.: US 7,324,678 B2
(45) Date of Patent: Jan. 29, 2008

(54) METHOD FOR DETERMINING NOISE IN RADIOGRAPHY

(75) Inventor: Cyril Allouche, Montfort l'Amaury (FR)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 665 days.

(21) Appl. No.: 10/676,200

(22) Filed: Oct. 1, 2003

(65) Prior Publication Data

US 2004/0081344 A1 Apr. 29, 2004

(30) Foreign Application Priority Data

Oct. 29, 2002 (FR) ................... 02 13566

(51) Int. Cl.
*G06K 9/00* (2006.01)
*G06K 9/40* (2006.01)

(52) U.S. Cl. .................. 382/132; 382/266; 378/6

(58) Field of Classification Search ........... 382/132, 382/128, 266; 378/42, 6, 44–50
See application file for complete search history.

(56) References Cited

U.S. PATENT DOCUMENTS

| | | | |
|---|---|---|---|
| 5,396,531 A | 3/1995 | Hartley | 378/108 |
| 5,818,896 A * | 10/1998 | Hsieh | 378/15 |
| 6,204,891 B1 * | 3/2001 | Florent | 348/616 |
| 6,256,403 B1 * | 7/2001 | Florent et al. | 382/128 |
| 6,314,160 B1 * | 11/2001 | Dhawale et al. | 378/98.2 |
| 6,498,831 B2 * | 12/2002 | Granfors et al. | 378/98.8 |
| 7,054,474 B1 * | 5/2006 | Krieger | 382/128 |

FOREIGN PATENT DOCUMENTS

EP 0854366 7/1998

OTHER PUBLICATIONS

Baehring et al, "Die Periodogramm—Analyse Zur Signal—Und Rauschbenertung Im Roentgenfernseh Signal". Biomedizinische Technik Fachverlag Schiele Uno Schoen GMBH, Berlin, OE, vol. 40, No. 11, Nov. 1995, pp. 310-315.
Wilson et al., "Perception of Temporally Filtered X-Ray Fluoroscopy Images", IEEE Transactions on Medical Imaging, Jan. 1999, vol. 18, No. 1, pp. 22-31.

* cited by examiner

*Primary Examiner*—Jingge Wu
*Assistant Examiner*—Jeffrey S Smith
(74) *Attorney, Agent, or Firm*—Cantor Colburn LLP

(57) ABSTRACT

In order to model a fluoroscopic noise present in a radiography operation, two successive images of a same zone are used so that it is possible to pair the dots of the two images as a function of the zone of the space that they represent. The pairs of dots are grouped in sub-groups according to their gray level. For each sub-group, the mean standard deviation $\sigma$ of the $Pi(x, y)-Pi-1(x, y)$ values is computed. A sub-group is discriminated by eliminating the dots for which $Pi(x, y)-Pi-1(x, y)$ is greater than the mean of the values $Pi(x, y)-Pi-1(x, y)$ plus k times the mean standard deviation. These computations are repeated a certain number of times. Once the sub-group is discriminated, its centering is assessed. A sub-group is non-centered if its mean is greater than 1.5 times its mean standard deviation. Pairs of dots $(v, \sigma)$ are then obtained. From these dots, an iterative regression is performed to obtain a model of noise according to $\sigma(v)=\alpha.\sqrt{v}+\beta.v+\gamma$, where v is the gray level and $\alpha$, $\beta$ and $\gamma$ are coefficients defining the noise.

54 Claims, 3 Drawing Sheets

METHOD FOR DETERMINING NOISE IN RADIOGRAPHY

CROSS-REFERENCE TO RELATED APPLICATIONS

This application claims the benefit of a priority under 35 USC 119 (a)-(d) to French Patent Application No. 02 13566 filed Oct. 29, 2002, the entire contents of which are hereby incorporated by reference.

BACKGROUND OF THE INVENTION

The invention and embodiments thereof is directed to a method for determining noise in radiography and, in particular in fluoroscopic noise. The field of the invention is that of imaging, and more precisely that of the reduction of fluoroscopic noise in images. The field of the invention is more particularly for the reduction of noise in images acquired in time-based sequences in radiography.

In the prior art, it is known that there is a fluoroscopic noise in fluoroscopy and that the standard deviation of this fluoroscopic noise is proportional to the square root of the number of photons reaching the detector.

In the prior art, the presence of this noise is known but is not specifically dealt with except on the basis of the experience of an observer using the images in order to interpret them. There is then a problem of interpretation, but also a problem of exposure to an object to be imaged, such as a patient. It may become necessary to increase the radiation dose in order to improve the signal-to-noise ratio of the image, i.e., to increase the proportion of relevant information in the image. This increase in radiation is not free of consequences for the object, particularly a patient, which then has a risk of being destroyed or damaged or subject to greater than recommended exposure to radiation.

BRIEF DESCRIPTION OF THE INVENTION

In an embodiment of the invention, the problem of fluoroscopic noise is resolved by providing a model of the noise. When the noise has been modeled, it is possible to eliminate it from the image and thus improve the readability of the image and, if necessary, reduce the radiation dose required to obtain a readable image.

In an embodiment of the invention a method for determining noise in radiography comprises:

acquiring at least two images, i−1 and i, of a same zone;

coding the acquired images into digital images that can be identified with matrices having horizontal by vertical dimensions equal to N×M, each digital image being then formed by N.M dots, each dot of an image i being identifiable by its coordinates $0<x<N$, and $0<y<M$, this dot then being referred to as a dot $Pi(x,y)$, each dot $Pi(x,y)$ then having a corresponding value v which is the result of the acquisition of the image, the value v having a dynamic range from Vmin to Vmax;

dividing the dynamic range Vmax-Vmin into sub-groups defined by a lower limit Bi and an upper limit Bs, the sub-groups having a null intersection, the joining of the sub-groups covering the dynamic range Vmax-Vmin, a dot of an image i then belonging to a given sub-group when $Bi<=Pi(x,y)<Bs$, where $Pi(x,y)$ is the gray level of the pixel of the image i with coordinates (x,y);

computing, for at least one sub-group SG, of the standard deviation σ of the values $Pi(x,y)-Pi-1(x,y)$;

discriminating the values $Pi(x,y)$ of SG to keep only those values such that the criterion C: $Pi(x,y)-Pi-1(x,y)<\mu(Pi(x,y)-Pi-1(x,y))+k.\sigma$, is met and thus, a sub-group SG' is obtained, where μ is a mean value;

applying the same processing operations to the sub-group SG' as to the sub-group SG by iteration until a sub-group SG", corresponding to an end-of-iteration criterion, is obtained;

performing iterative processing operations on all the sub-groups defined in the dynamic range Vmax-Vmin and thus, for each sub-group, a mean standard deviation, associated with an x-axis value $v=(Bi+Bs)/2$, is obtained; and performing an operation of regression on the dots obtained at the previous step to determine the coefficients α, β and γ of the noise function: $\sigma(v)=\alpha.\sqrt{v}+\beta.v+\gamma$ defining the noise for a given value v.

BRIEF DESCRIPTION OF THE DRAWINGS

The invention will be understood more clearly from the following description and from the accompanying figures, which are given purely by way of an embodiment and in no way restrict the scope of the invention. Of these figures.

DETAILED DESCRIPTION OF THE INVENTION

In an embodiment of the invention, the problem of fluoroscopic noise is resolved by filtering the image obtained so as to improve its quality. Thus, the fluoroscopic noise is eliminated after it has been determined/modeled. This noise is totally determined, hence modeled, by its mean standard deviation. This mean standard deviation is itself a function of the square root of the number of photons received by a detector. The number of photons itself is related to a gray level in a digital image. Digital images are thus used to obtain the modeling. This modeling is done in several steps. In a first step, two digital images of the same zone are acquired. In an embodiment of the invention, an image, unless otherwise indicated, is a digital image. It will be noted here that the teaching of the invention is valid whatever the nature of the sensor, whether digital or analog, used to obtain the images. Each pixel or dot of an image is paired with a pixel of the other image by means of its coordinates in the image. Each pixel also has a gray level value, or gray level. The pixels are grouped together by gray level intervals and thus sub-groups of pixels are obtained. For each sub-group of pixels, a discrimination is made as follows: the mean μ and the standard deviation σ of $Pi(x,y)-Pi-1(x,y)$ are computed, where $Pi(x, y)$ is the gray level of the pixel of the image i with coordinates (x, y). Then, in a sub-group, only the values $P(x,y)$ are kept such that $Pi(x,y)-Pi-1(x,y)<\mu+k.\sigma$. This discrimination is repeated iteratively on the result of the preceding discrimination. This discrimination greatly reduces blur. To obtain even more reliable sub-groups, the method eliminates those that, at the end of the discrimination, are not centered, namely those whose mean is greater than 1.5 times the standard deviation. Then there is knowledge of a collection of pairs v, σ) where v is a gray level. These pairs enable an operation of regression leading to parameters α, β and γ such that $\sigma(v)=\alpha.\sqrt{v}+\beta.v+\gamma$, where σ(v) is the modeling of the fluoroscopic noise. This regression is made robust by iterating it after weighting the σ values of the pairs (v, σ) drawing the curve upwards so as to obtain a curve that passes above the majority of the dots (v, σ).

Figure 1:
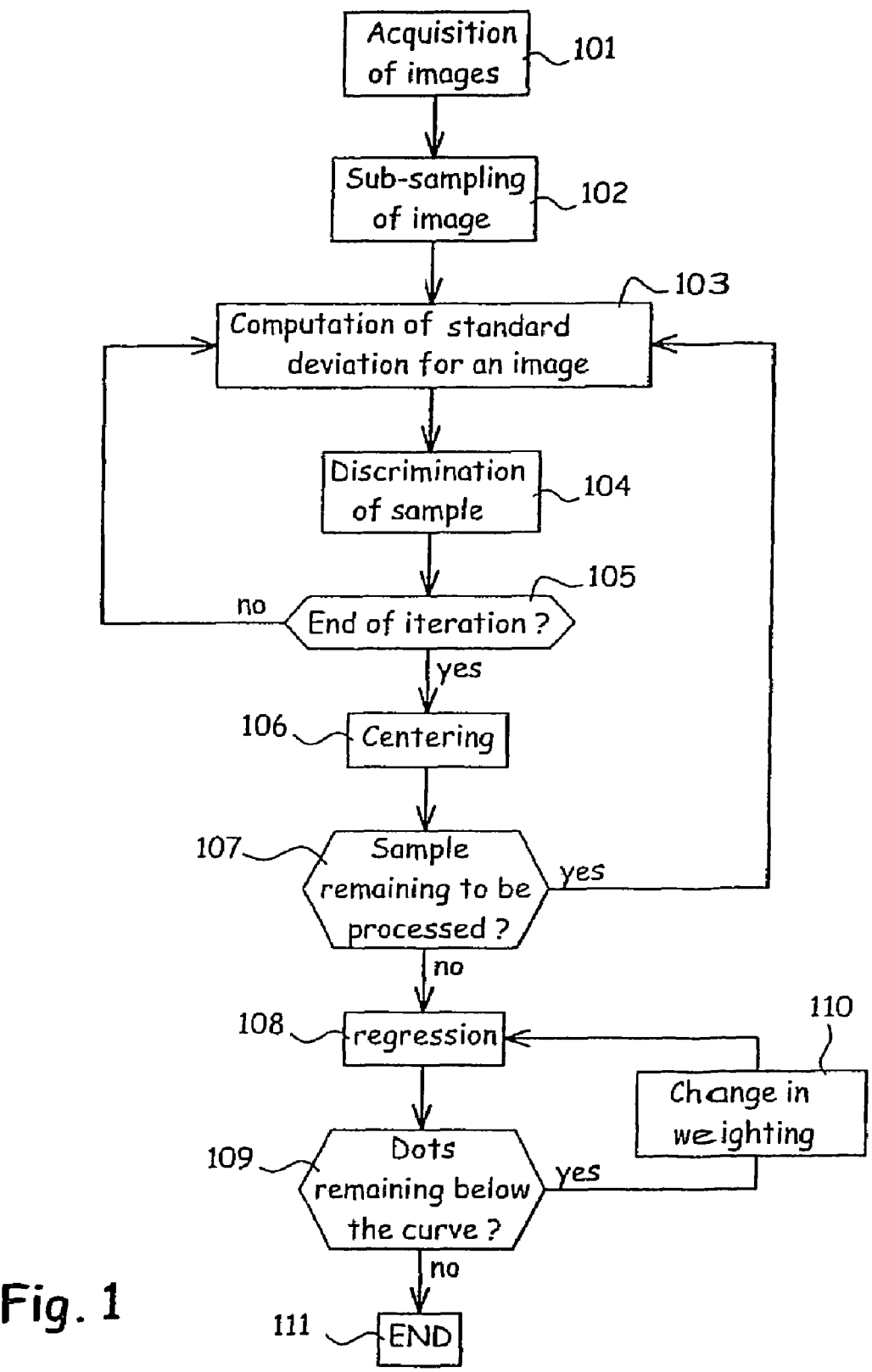
FIG. 1 illustrates the method according an embodiment of the invention.
Figure 4:
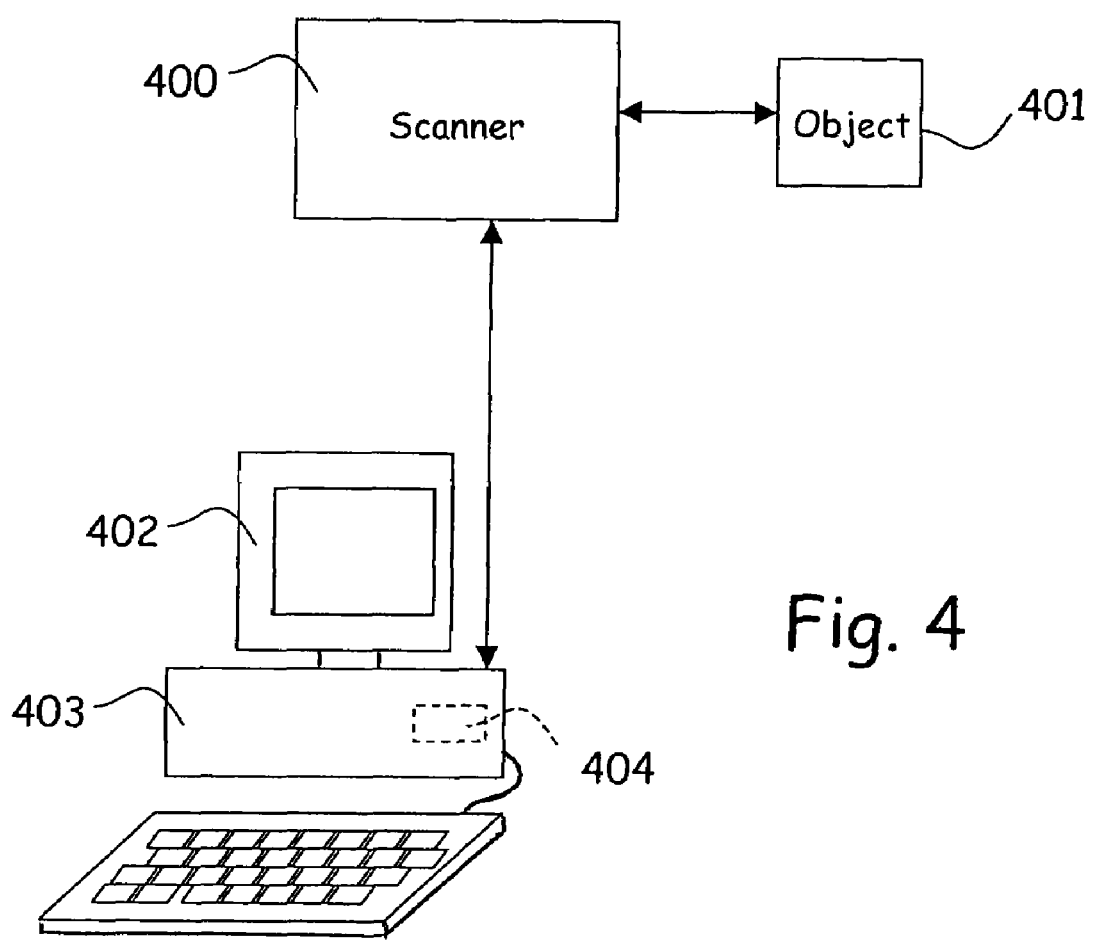
FIG. 4 illustrates a scanner type radiography system.

FIG. 1 shows a preliminary image acquisition step 101. Referring now to FIG. 4, the acquisition is performed by a scanner type radiography apparatus 400 used to acquire images of an object 401, such as internal organs of a living organism, particularly the human body. The technologies of these apparatuses are based on the emission of radiation received on or at a sensor/detector after it has gone through the object 401. The radiation received by the sensor/detector therefore depends on the object 401 crossed. The sensor/detector produces a digital image that can be viewed on a screen 402, printed, and/or processed by a computer 403, or any apparatus comprising processing circuits. The method is recorded in a memory 404 in the form of instruction codes and implemented by a microprocessor, in order to improve the interpretation of an image and/or reduce the dose of radiation used to carry out an examination. This memory 404 and this microprocessor are preferably contained in the radiography apparatus 400. In practice, this memory 404 and this microprocessor are connected to the radiography apparatus 400, either by an internal connector or by a connector external to the radiography apparatus 400.

Classically, an image has 1000×1000 resolution and therefore has one million pixels, each pixel being identified by its coordinates in the image and each pixel being associated with a value of gray level, intensity or another numerical value. In the present example, it shall be assumed that this is a gray level obtained after fluoroscopic exposure, namely exposure to weak radiation. An image can be likened to a table having N rows by M columns. N and M are not systematically equal to 1000; their values depend on the spatial resolution of the sensor/detector used. Their values do not affect the efficiency of the method. The mode of operation remains valid for non-fluoroscopic exposure.

In fluoroscopy, the standard deviation of the fluoroscopic noise is proportional to the square root of the number of photons reaching the detector. However, the gray level is proportional to the quantity of photons received. This enables working on the gray levels.

Fluoroscopic noise is the resultant of the quantum noise and the response of the image acquisition system, namely of the detector. The method described deals with the totality formed by the quantum noise and the apparatus 400. Technically speaking, the method is not specific to quantum noise or to an apparatus, but it can be applied to any other noise that is not spatially correlated.

For most of the examinations, the images are acquired in temporal sequences, namely one after the other. This makes it possible to observe an object, such as an organ during a cycle, for example, the heart cycle. In an examination of this kind, there are therefore several successive images, or shots, of a same region of the object. The successive images have the same resolution and two pixels with the same coordinates correspond to a same region of the object, unless the object has shifted between the two shots. Such shifts may occur when it is sought to obtain an image of the heart for example.

Figure 2:
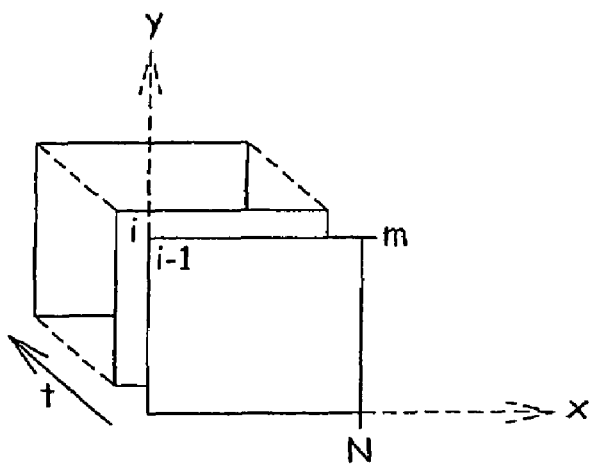
FIG. 2 illustrates an image sequence.

Consider that the radiography apparatus 400 has acquired two images i−1 and i of a same region of an object 401. The images have an N-pixel horizontal resolution and an M-pixel vertical resolution, as shown in FIG. 2. A pixel with coordinates (x, y) of an image i has a gray level equal to Pi(x, y).

Step 101 proceeds to step 102 for sub-sampling images coming from the radiography apparatus 400. Each pixel of an image has an associated value corresponding to a gray level. This value has a certain dynamic range. In other words, each pixel has an associated value ranging from Vmin to Vmax. Conventionally Vmin is equal to 0 and Vmax to $2^{14}$. In practice, Vmin and Vmax depend on the sensor used and its calibration. When an image is sub-sampled, the interval [Vmin, Vmax] is divided into intervals separated in such a way that the joining of the sub-intervals covers [Vmin, Vmax]. Each sub-interval [Bi, Bs] included in [Vmin, Vmax] has a corresponding sub-group of pixels such that Bi<=Pi(x,y)<Bs.

In practice, the sub-intervals have a dynamic range of 20. That is, the interval [Vmin, Vmax] is sub-divided into sub-intervals with a width of 20. The sub-sampling then comprises distributing the dots of an image in the sub-groups corresponding to the sub-intervals. It is possible that there are empty sub-groups. A sub-group may also be called a sample.

In practice, the sub-sampling is done as soon as a decision is taken on the sub-division into sub-intervals and there is no physical distribution. The distribution is done by the simple reading of the gray level of a pixel. The distribution into sub-groups is done by reading the image i.

Step 102 proceeds to step 103 for computing a mean standard deviation for a sample. Step 103 considers the dots of a sub-group SG of the image i in correspondence with dots of the image i−1. Dots are in correspondence when they have the same coordinates. A sub-group in the image i determines a sub-group comprising the same dots in the image i−1. In step 103 a computation is therefore made of the standard deviation σ of the values (Pi(x, y)−Pi−1(x, y)) with (x, y) belonging to SG.

Step 103 proceeds to step 104 for discriminating the sub-group SG. This discrimination comprises the elimination of the aberrant dots resulting for example from a blur of the object to be imaged. The discrimination is done according to the following criterion: (x, y) of SG belongs to SG' if and only if: Pi(x,y)−Pi−1(x,y)<μ(Pi(x,y)−Pi−1(x,y))+k.σ, where μ(Pi(x,y)−Pi−1(x,y)) is the mean of the values (Pi(x, y)−Pi−1(x,y)) for (x, y) in SG. SG' is therefore included in SG but it can happen that it does not include all the dots of SG.

The number k is a parameter of the algorithm, and is preferably equal to 2, but any other non-zero number would be suitable. The greater the number k chosen, the less discriminatory is the algorithm. A number k greater than 10 is therefore also appropriate but the discrimination is then very weak.

Step 104 proceeds to step 105 for determining the end of the iteration. A first possible criterion for the end of the iteration is that SG' must be identical to SG. In this case, the method proceeds to a centering step 106. If not SG is replaced by SG' then steps 103 and 104 are resumed.

A second possible criterion for the end of iteration is a number of loops. In this case, in step 105, SG is replaced by SG' and the operation is resumed at step 103. This replacement is done a predefined maximum number of times, for example, five times. However, this number is given by way of an example and can be parametrized as a function of the quality of the modeling to be obtained. The greater this number, the greater the quality but the longer the modeling.

In practice, the first and second criteria can be combined through logical combination. The criterion then is that the iteration is done so long as the number of iterations is smaller than the maximum number and so long as SG is different from SG'.

In step 105, if the end-of-iteration criterion is not valid, the method proceeds to step 103 after having performed the operation SG=SG'. If not, the method proceeds to step 106.

Step 106 provides an even more robust method. Step 106 eliminates, from the processing, the samples, or sub-groups SG', resulting from step 105 such that: $\mu(Pi(x,y)-Pi-1(x,y))$ >1.$\sigma(Pi(x,y)-Pi-1(x,y))$, with (x, y) in SG' and 1 being conventionally equal to 1.5. The eliminating of a sub-group means that the sub-group will no longer be taken into account starting with step 108.

Step 106 proceeds to step 107 in which it is verified that all the sub-groups determined during step 102 had been processed. If this is not the case, steps 103 to 106 are repeated for all the sub-groups that have not yet been processed.

At the end of step 107, a value v and a mean standard deviation σ can be associated with each non-empty group that was not removed at step 106. The mean value v is the mean value of the sub-interval that was used to initially determine the sub-group. Given that a sub-interval is determined by a lower limit Bi and an upper limit Bs, v is equal to (Bi+Bs)/2. the standard deviation σ is the last mean standard deviation computed for the sub-group. At step 107 there is collection of pairs (v, σ).

Figure 3:
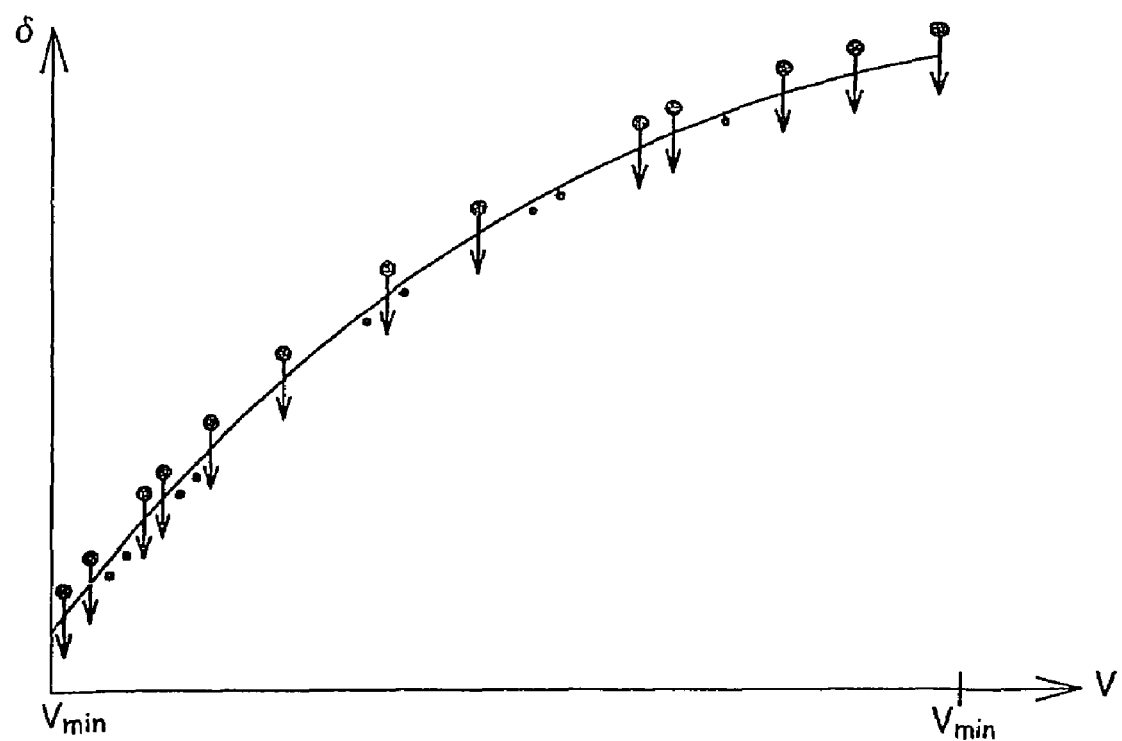
FIG. 3 is a graphic representation of the pairs (v, σ)

Step 107, when there is no longer any sub-group to be processed, proceeds to a regression step 108. FIG. 3 illustrates that it is possible to graphically represent the pairs (v, σ), in placing v on the x-axis, v ranging from Vmin to Vmax. Starting from the pairs (v, σ), an operation of regression is performed so as to determine the first coefficients α, β and γ modeling a curve $\sigma(v)=\alpha.\sqrt{v}+\beta.v+\gamma$ passing as close as possible to the set of the pairs (v, σ).

Step 108 proceeds to step 109 in which an end-of-iteration criterion is assessed. A first end-of-iteration criterion is, for example, the presence of dots under the curve defined at step 108. If such dots exist, the method proceeds to step 110 in which the weighting of these dots is modified. Step 110 proceeds to step 108. If such dots do not exist, the method proceeds from step 109 to end step 111. Step 108 is therefore performed several times on the basis of a collection of pairs whose weighting evolves as a function of the position of the pair with respect to the last curve determined, i.e., with reference to the last coefficients α, β and γ determined at step 108.

A second end-of-iteration criterion is the use of an iteration counter. In this second criterion, steps 108 to 110 are carried out a predetermined number R times. In practice, R is equal to 5. However, it is possible to use any value whatsoever for R.

An embodiment may use the first and second criteria combined by a logic operator, making it possible to take into account the most favorable conditions for stopping the iteration in terms of processing time. Thus, the iteration is stopped as soon as the maximum number of iterations is reached or as soon as there are no longer any pairs below the last determined curve.

In step 110, a refining of the regression of the step 108 is prepared. This refining is done through a weighting of the pairs (v, σ) located above the curve defined at the step 108. These dots are easily detected. They are dots for which σ(v)<σ. For these pairs, a weighting P strictly smaller than 1 is applied to the value σ of the pair (v, σ) which then becomes (v, P.σ). Step 110 then proceeds to step 108 of regression with all the pairs (v, σ), whether weighted or not, coming form step 110. A typical value of P is 0.95, but any value whatsoever included in the interval [0 . . . 0,99] is appropriate. Satisfactory results are obtained with a value P in the interval [0,75 . . . 1].

When the end-of-iteration condition is fulfilled, the method proceeds from step 109 to the end step 111. In step 111, the apparatus 400 having performed the processing possesses coefficients α, β and γ of the function: $\sigma(v)=\alpha.\sqrt{v}+\beta.v+\gamma$ modeling the fluoroscopic noise during an examination implementing a fluoroscopic noise. Having carried out the processing, the apparatus 400 uses these coefficients either to determine a filter enabling the production of an image in which fluoroscopic noise has been substantially reduced or to parametrize the fluoroscopy apparatus 400.

In the case of a filtering operation, the image after filtering is therefore free of fluoroscopic noise. This favors the reading and interpretation of this image by a practitioner. Therefore the practitioner then can place greater reliance on the images given by the radiography apparatuses 400.

As for the parametrizing of the fluoroscopy apparatus 400, it is useful because, once the coefficients are determined, the quantity of noise present in an image and, hence, the signal-to-noise ratio, are known. If this signal-to-noise ratio is satisfactory, i.e., if there is a lot of signal and little noise, the dose of radiation emitted by the fluoroscopy device 400 is reduced. The examination then becomes less traumatic for the patient. On the other hand, if the signal-to-noise ratio is poor, the radiation dose is increased so that the examination is relevant. In both cases, a gain in obtained because the optimum dose of radiation needed to obtain the most relevant result possible has been successfully determined.

In practice, both uses of the coefficients α, β and γ are implemented. An image sequence comprises a variable number of images. The first two images of the sequence are used to determine the coefficients α, β and γ that will subsequently be applied to the processing of all the images of the sequence.

In an embodiment of the invention, the coefficients α, β and γ are computed for each image of the sequence. Each image is then associated with its own set of coefficients.

The description uses an image i to define the sub-groups, and the image i is paired with the preceding image i−1. In an embodiment of the invention, the image i can also be paired with a following image 1+1.

The method and embodiments thereof is implemented either in a digital image processing station 403 or in a device 403 for the control of a radiography apparatus 400. With the machines commonly used in radiography, the method and embodiments thereof give results within about thirty milliseconds for the processing of an image having a definition of one million pixels. These performance levels are highly satisfactory in a real-time context. An operator does not feel that he/she is waiting for the image.

In an embodiment of the invention, the end-of-iteration criterion is a number of iterations greater than 5. In an embodiment of the invention, R is in the interval [3 . . . 10]. In an embodiment of the invention, R is greater than 10.

Hence, the method and embodiments thereof provide: (1) for the reduction of fluoroscopic noise in images; (2) the reduction of fluoroscopic noise in digital images coming from a fluoroscopic acquisition method; (3) the robust determining of fluoroscopic noise; (4) the real-time determining of fluoroscopic noise; and (5) the regulation of the quantity of radiation received by patient during a radiography examination.

One skilled in the art may make or propose various modifications to the structure and/or steps and/or function and/or way and/or result of the disclosed embodiments without departing from the scope and extent of protection.

What is claimed is:

1. A method for determining noise in radiography comprising:
   acquiring at least two images, i−1 and i, of a same zone;
   coding the acquired images into digital images that can be identified with matrices having horizontal by vertical dimensions equal to N×M, each digital image being then formed by N.M dots, each dot of an image i being identifiable by its coordinates 0<x<N, and 0<y<M, this dot then being referred to as a dot Pi(x,y), each dot Pi(x,y) then having a corresponding value v which is a result of the acquisition of the image, the value v having a dynamic range from Vmin to Vmax;
   dividing the dynamic range Vmax-Vmin into sub-groups defined by a lower limit Bi and an upper limit Bs, the sub-groups having a null intersection, a joining of the sub-groups covering the dynamic range Vmax-Vmin, a dot of an image i then belonging to a given sub-group when Bi<=Pi(x,y)<Bs, where Pi(x,y) is the gray level of the pixel of the image i with coordinates (x,y);
   computing, for at least one sub-group SG, of the standard deviation σ of the values Pi(x,y)−Pi−1(x,y);
   discriminating the values Pi(x,y) of SG to keep only those values such that the criterion C: Pi(x,y)−Pi−1(x,y)<μ (Pi(x,y)−Pi−1(x,y))+k.σ, is met and thus, a sub-group SG' is obtained, where μ is a mean value;
   applying the same computing and discriminating processing operations to the sub-group SG' as to the sub-group SG by iteration until a sub-group SG", corresponding to an end-of-iteration criterion, is obtained;
   performing iterative processing operations on all the sub-groups defined in the dynamic range Vmax-Vmin and thus, for each sub-group, a standard deviation, associated with an x-axis value v=(Bi+Bs)/2, is obtained;
   performing an operation of regression on the dots obtained at the previous step to determine the coefficients α, β and γ of a noise function: σ(v)=α.√v+β.v+γ defining the noise for a given value v; and
   producing an image in which noise has been reduced based upon the noise function.

2. The method according to claim 1 wherein, before the regression and after the discrimination, the method eliminates, for the remainder of the processing, non-centered sub-groups, that is, the sub-groups such that the mean of the sub-group is greater than 1 times the standard deviation.

3. The method according to claim 2 wherein the noise function is applied to the image i to reduce the noise in this image.

4. The method according to claim 1 wherein the noise function is applied to the image i to reduce the noise in this image.

5. The method according to claim 1 wherein k is a non-null number.

6. The method according to claim 2 wherein k is a non-null number.

7. The method according to claim 3 wherein k is a non-null number.

8. The method according to claim 1 wherein the end-of-iteration criterion is a number of iterations greater than 5.

9. The method according to claim 2 wherein the end-of-iteration criterion is a number of iterations greater than 5.

10. The method according to claim 3 wherein the end-of-iteration criterion is a number of iterations greater than 5.

11. The method according to claim 5 wherein the end-of-iteration criterion is a number of iterations greater than 5.

12. The method according to claim 1 wherein the end-of-iteration criterion is the fact that all the dots of SG' meet the criterion C.

13. The method according to claim 2 wherein the end-of-iteration criterion is the fact that all the dots of SG' meet the criterion C.

14. The method according to claim 3 wherein the end-of-iteration criterion is the fact that all the dots of SG' meet the criterion C.

15. The method according to claim 5 wherein the end-of-iteration criterion is the fact that all the dots of SG' meet the criterion C.

16. The method according to claim 8 wherein the end-of-iteration criterion is the fact that all the dots of SG' meet the criterion C.

17. The method according to claim 1 wherein:
   during a first regression, first coefficients α, β and γ are obtained;
   determining a first curve that separates the sub-groups into two, those whose standard deviation is above the first curve and those whose standard deviation is below the first curve;
   a weighting P of less than 1 is applied to the standard deviation of the sub-groups whose standard deviation is located above the first curve;
   a second regression is performed from the weighted sub-groups to obtain second coefficients α', β' and γ' determining a new noise curve; and
   from the new curve, the same computing and discriminating processing operations are carried out as those performed from the first curve, iteratively, for a number of times equal to R.

18. The method according to claim 2 wherein:
   during a first regression, first coefficients α, β and γ are obtained;
   determining a first curve that separates the sub-groups into two, those whose standard deviation is above the first curve and those whose standard deviation is below the first curve;
   a weighting P of less than 1 is applied to the standard deviation of the sub-groups whose standard deviation is located above the first curve;
   a second regression is performed from the weighted sub-groups to obtain second coefficients α', β' and γ' determining a new noise curve; and
   from the new curve, the same computing and discriminating processing operations are carried out as those performed from the first curve, iteratively, for a number of times equal to R.

19. The method according to claim 3 wherein:
   during a first regression, first coefficients α, β and γ are obtained;
   determining a first curve that separates the sub-groups into two, those whose standard deviation is above the first curve and those whose standard deviation is below the first curve;
   a weighting P of less than 1 is applied to the standard deviation of the sub-groups whose standard deviation is located above the first curve;
   a second regression is performed from the weighted sub-groups to obtain second coefficients α', β' and γ' determining a new noise curve; and from the new curve, the same computing and discriminating processing operations are carried out as those performed from the first curve, iteratively, for a number of times equal to R.

20. The method according to claim 4 wherein:

during a first regression, first coefficients α, β and γ are obtained;

determining a first curve that separates the sub-groups into two, those whose standard deviation is above the first curve and those whose standard deviation is below the first curve;

a weighting P of less than 1 is applied to the standard deviation of the sub-groups whose standard deviation is located above the first curve;

a second regression is performed from the weighted sub-groups to obtain second coefficients α', β' and γ' determining a new noise curve; and from the new curve, the same computing and discriminating processing operations are carried out as those performed from the first curve, iteratively, for a number of times equal to R.

21. The method according to claim 8 wherein:

during a first regression, first coefficients α, β and γ are obtained;

determining a first curve that separates the sub-groups into two, those whose standard deviation is above the first curve and those whose standard deviation is below the first curve;

a weighting P of less than 1 is applied to the standard deviation of the sub-groups whose standard deviation is located above the first curve;

a second regression is performed from the weighted sub-groups to obtain second coefficients α', β' and γ' determining a new noise curve; and from the new curve, the same computing and discriminating processing operations are carried out as those performed from the first curve, iteratively, for a number of times equal to R.

22. The method according to claim 12 wherein:

during a first regression, first coefficients α, β and γ are obtained;

determining a first curve that separates the sub-groups into two, those whose standard deviation is above the first curve and those whose standard deviation is below the first curve;

a weighting P of less than 1 is applied to the standard deviation of the sub-groups whose standard deviation is located above the first curve;

a second regression is performed from the weighted sub-groups to obtain second coefficients α', β' and γ' determining a new noise curve; and from the new curve, the same computing and discriminating processing operations are carried out as those performed from the first curve, iteratively, for a number of times equal to R.

23. The method according to claim 17 wherein P is in the interval 0,75 . . . 0,99.

24. The method according to claim 18 wherein P is in the interval 0,75 . . . 0,99.

25. The method according to claim 19 wherein P is in the interval 0,75 . . . 0,99.

26. The method according to claim 20 wherein P is in the interval 0,75 . . . 0,99.

27. The method according to claim 21 wherein P is in the interval 0,75 . . . 0,99.

28. The method according to claim 22 wherein P is in the interval 0,75 . . . 0,99.

29. The method according to claim 23 wherein P is in the interval 0,75 . . . 0,99.

30. The method according to claim 17 wherein P is in the interval 0 . . . 0,75.

31. The method according to claim 18 wherein P is in the interval 0 . . . 0,75.

32. The method according to claim 19 wherein P is in the interval 0 . . . 0,75.

33. The method according to claim 20 wherein P is in the interval 0 . . . 0,75.

34. The method according to claim 21 wherein P is in the interval 0 . . . 0,75.

35. The method according to claim 22 wherein P is in the interval 0 . . . 0,75.

36. The method according to claim 23 wherein P is in the interval 0 . . . 0,75.

37. The method according to claim 17 wherein R is in the interval 3 . . . 10.

38. The method according to claim 18 wherein R is in the interval 3 . . . 10.

39. The method according to claim 19 wherein R is in the interval 3 . . . 10.

40. The method according to claim 20 wherein R is in the interval 3 . . . 10.

41. The method according to claim 21 wherein R is in the interval 3 . . . 10.

42. The method according to claim 22 wherein R is in the interval 3 . . . 10.

43. The method according to claim 23 wherein R is in the interval 3 . . . 10.

44. The method according to claims 17 wherein R is greater than 10.

45. The method according to claims 18 wherein R is greater than 10.

46. The method according to claims 19 wherein R is greater than 10.

47. The method according to claims 20 wherein R is greater than 10.

48. The method according to claims 21 wherein R is greater than 10.

49. The method according to claims 22 wherein R is greater than 10.

50. The method according to claims 23 wherein R is greater than 10.

51. A computer program product comprising a computer useable medium having computer readable program code means embodied in the medium, the computer readable program code means executable by a computer for implementing steps of a method comprising:

acquiring at least two images, i−1 and i, of a same zone;

coding the acquired images into digital images that can be identified with matrices having horizontal by vertical dimensions equal to N×M, each digital image being then formed by N.M dots, each dot of an image i being identifiable by its coordinates $0<x<N$, and $0<y<M$, this dot then being referred to as a dot $Pi(x,y)$, each dot $Pi(x,y)$ then having a corresponding value v which is the result of the acquisition of the image, the value v having a dynamic range from Vmin to Vmax;

dividing the dynamic range Vmax-Vmin into sub-groups defined by a lower limit Bi and an upper limit Bs, the sub-groups having a null intersection, the joining of the sub-groups covering the dynamic range Vmax-Vmin, a dot of an image i then belonging to a given sub-group when $Bi<=Pi(x,y)<Bs$, where $Pi(x,y)$ is the gray level of the pixel of the image i with coordinates (x,y);

computing, for at least one sub-group SG, of the standard deviation σ of the values $P_i(x,y)-P_{i-1}(x,y)$;

discriminating the values $P_i(x,y)$ of SG to keep only those values such that the criterion C: $P_i(x,y)-P_{i-1}(x,y)<\mu(P_i(x,y)-P_{i-1}(x,y))+k.\sigma$, is met and thus, a sub-group SG' is obtained, where μ is a mean value;

applying the same computing and discriminating processing operations to the sub-group SG' as to the sub-group SG by iteration until a sub-group SG", corresponding to an end-of-iteration criterion, is obtained;

performing iterative processing operations on all the sub-groups defined in the dynamic range Vmax-Vmin and thus, for each sub-group, a standard deviation, associated with an x-axis value $v=(B_i+B_s)/2$, is obtained;

performing an operation of regression on the dots obtained at the previous step to determine the coefficients α, β and γ of the noise function: $\sigma(v)=\alpha.\sqrt{v}+\beta.v+\gamma$ defining the noise for a given value v; and producing an image in which noise has been reduced based upon the noise function.

52. An article of manufacture for use with a computer system, the article of manufacture comprising a computer readable medium having computer readable program code means embodied in the medium, the program code means implementing steps of a method, the program code means comprising:

computer readable program code means embodied in a medium for causing a computer to provide for acquiring at least two images, i–1 and i, of a same zone;

computer readable program code means embodied in a medium for causing a computer to provide for coding the acquired images into digital images that can be identified with matrices having horizontal by vertical dimensions equal to N×M, each digital image being then formed by N.M dots, each dot of an image i being identifiable by its coordinates 0<x<N, and 0<y<M, this dot then being referred to as a dot $P_i(x,y)$, each dot $P_i(x,y)$ then having a corresponding value v which is the result of the acquisition of the image, the value v having a dynamic range from Vmin to Vmax;

computer readable program code means embodied in a medium for causing a computer to provide for dividing the dynamic range Vmax-Vmin into sub-groups defined by a lower limit $B_i$ and an upper limit $B_s$, the sub-groups having a null intersection, the joining of the sub-groups covering the dynamic range Vmax-Vmin, a dot of an image i then belonging to a given sub-group when $B_i<=P_i(x,y)<B_s$, where $P_i(x,y)$ is the gray level of the pixel of the image i with coordinates (x,y);

computer readable program code means embodied in a medium for causing a computer to provide for computing, for at least one sub-group SG, of the standard deviation σ of the values $P_i(x,y)-P_{i-1}(x,y)$;

computer readable program code means embodied in a medium for causing a computer to provide for discriminating the values $P_i(x,y)$ of SG to keep only those values such that the criterion C: $P_i(x,y)-P_{i-1}(x,y)<\mu(P_i(x,y)-P_{i-1}(x,y))+k.\sigma$, is met and thus, a sub-group SG' is obtained, where μ is a mean value;

computer readable program code means embodied in a medium for causing a computer to provide for applying the same computing and discriminating processing operations to the sub-group SG' as to the sub-group SG by iteration until a sub-group SG", corresponding to an end-of-iteration criterion, is obtained;

computer readable program code means embodied in a medium for causing a computer to provide for performing iterative processing operations on all the sub-groups defined in the dynamic range Vmax-Vmin and thus, for each sub-group, a standard deviation, associated with an x-axis value $v=(B_i+B_s)/2$, is obtained;

computer readable program code means embodied in a medium for causing a computer to provide for performing an operation of regression on the dots obtained at the previous step to determine the coefficients α, β and γ of the noise function: $\sigma(v)=\alpha.\sqrt{v}+\beta.v+\gamma$ defining the noise for a given value v; and computer readable program code means embodied in a medium for causing a computer to provide for producing an image in which noise has been reduced based upon the noise function.

53. A program storage device readable by a computer tangibly embodying a program of instructions executable by the computer to perform steps of a method comprising:

acquiring at least two images, i–1 and i, of a same zone;

coding the acquired images into digital images that can be identified with matrices having horizontal by vertical dimensions equal to N×M, each digital image being then formed by N.M dots, each dot of an image i being identifiable by its coordinates 0<x<N, and 0<y<M, this dot then being referred to as a dot $P_i(x,y)$, each dot $P_i(x,y)$ then having a corresponding value v which is the result of the acquisition of the image, the value v having a dynamic range from Vmin to Vmax;

dividing the dynamic range Vmax-Vmin into sub-groups defined by a lower limit $B_i$ and an upper limit $B_s$, the sub-groups having a null intersection, the joining of the sub-groups covering the dynamic range Vmax-Vmin, a dot of an image i then belonging to a given sub-group when $B_i<=P_i(x,y)<B_s$, where $P_i(x,y)$ is the gray level of the pixel of the image i with coordinates (x,y);

computing, for at least one sub-group SG, of the standard deviation σ of the values $P_i(x,y)-P_{i-1}(x,y)$;

discriminating the values $P_i(x,y)$ of SG to keep only those values such that the criterion C: $P_i(x,y)-P_{i-1}(x,y)<\mu(P_i(x,y)-P_{i-1}(x,y))+k.\sigma$, is met and thus, a sub-group SG' is obtained, where μ is a mean value;

applying the same computing and discriminating processing operations to the sub-group SG' as to the sub-group SG by iteration until a sub-group SG", corresponding to an end-of-iteration criterion, is obtained;

performing iterative processing operations on all the sub-groups defined in the dynamic range Vmax-Vmin and thus, for each sub-group, a standard deviation, associated with an x-axis value $v=(B_i+B_s)/2$, is obtained;

performing an operation of regression on the dots obtained at the previous step to determine the coefficients α, β and γ of the noise function: $\sigma(v)=\alpha.\sqrt{v}+\beta.v+\gamma$ defining the noise for a given value v and producing an image in which noise has been reduced based upon the noise function.

54. The method of claim 1, further comprising:

acquiring images via determining and emitting a dose of radiation based upon the noise function.

* * * * *